(12) United States Patent
Sato (10) Patent No.: US 10,373,651 B2
(45) Date of Patent: Aug. 6, 2019

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yuki Sato, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 15/908,796

(22) Filed: Feb. 28, 2018

(65) Prior Publication Data

US 2019/0074039 A1 Mar. 7, 2019

(30) Foreign Application Priority Data

Sep. 4, 2017 (JP) ................................ 2017-169694

(51) Int. Cl.
*G11B 33/02* (2006.01)
*G11B 33/12* (2006.01)

(52) U.S. Cl.
CPC ............ *G11B 33/027* (2013.01); *G11B 33/02* (2013.01); *G11B 33/121* (2013.01)

(58) Field of Classification Search
None
See application file for complete search history.

(56) References Cited

U.S. PATENT DOCUMENTS

| 6,008,966 | A | * | 12/1999 | Forbord | G11B 5/486 360/99.18 |
| 6,055,134 | A | * | 4/2000 | Boutaghou | G11B 5/54 360/254.4 |
| 6,529,461 | B1 | | 3/2003 | Watanabe et al. | |
| 6,917,491 | B2 | | 7/2005 | Choi | |
| 7,283,323 | B2 | * | 10/2007 | Lee | G11B 25/043 360/97.12 |
| 7,817,373 | B2 | * | 10/2010 | Choi | G11B 33/08 360/97.19 |

(Continued)

FOREIGN PATENT DOCUMENTS

JP 2002124076 A 4/2002

*Primary Examiner* — William J Klimowicz
(74) *Attorney, Agent, or Firm* — Kim & Stewart LLP (57) ABSTRACT

A disk device includes a top cover and a disk medium with a recording surface. The top cover includes a center horizontal portion having a surface which extends from a center point of the disk medium along the recording surface to an outer peripheral portion, a curved portion having a surface which extends from the outer peripheral portion of the center horizontal portion in a direction away from the recording surface, and an outer horizontal portion having a surface which extends from the curved portion in a direction away from the center point and along the recording surface. The recording surface includes a first zone in which data is set to be written, and a second zone in which data is set not to be written, the second zone being disposed adjacent to the first zone on an outer edge side of the disk medium from the first zone.

17 Claims, 5 Drawing Sheets

(56) References Cited

U.S. PATENT DOCUMENTS

| | | | |
|---|---|---|---|
| 2003/0206368 A1* | 11/2003 | Choi | G11B 5/54 360/99.16 |
| 2005/0168866 A1* | 8/2005 | Cho | G11B 17/0287 360/97.19 |
| 2005/0180044 A1* | 8/2005 | Lee | G11B 25/043 360/97.12 |
| 2006/0002008 A1* | 1/2006 | Lim | G11B 25/043 360/97.19 |

* cited by examiner

DISK DEVICE

CROSS-REFERENCE TO RELATED APPLICATION

This application is based upon and claims the benefit of priority from Japanese Patent Application No. 2017-169694, filed Sep. 4, 2017, the entire contents of which are incorporated herein by reference.

FIELD

Embodiments described herein relate generally to a disk device.

BACKGROUND

A disk device includes a head held directly above a rotating disk medium with a minute gap, and data is written to or read from the disk medium through the head. Since data is written and read in this way, the disk medium is generally configured to be covered by a housing or the like so as to be protected from impact. However, depending on the situation at the time of impact and the degree of impact, the written data may not be appropriately protected.

DETAILED DESCRIPTION

Embodiments provide a disk device which may appropriately protect data written in a disk medium.

According to one embodiment, a disk device includes a top cover and a disk medium with a recording surface. The top cover includes a center horizontal portion having a surface which extends from a center point of the disk medium along the recording surface to an outer peripheral portion, a curved portion having a surface which extends from the outer peripheral portion of the center horizontal portion in a direction away from the recording surface, and an outer horizontal portion having a surface which extends from the curved portion in a direction away from the center point and along the recording surface. The recording surface includes a first zone in which data is set to be written, and a second zone in which data is set not to be written, the second zone being disposed adjacent to the first zone on an outer edge side of the disk medium from the first zone. The outer peripheral portion of the center horizontal portion includes a flat surface which extends along and faces the first zone and the second zone of the recording surface.

The disk device according to the embodiment will be described below with reference to the accompanying drawings. However, the present disclosure is not limited by this embodiment.

First Embodiment

Figure 1:
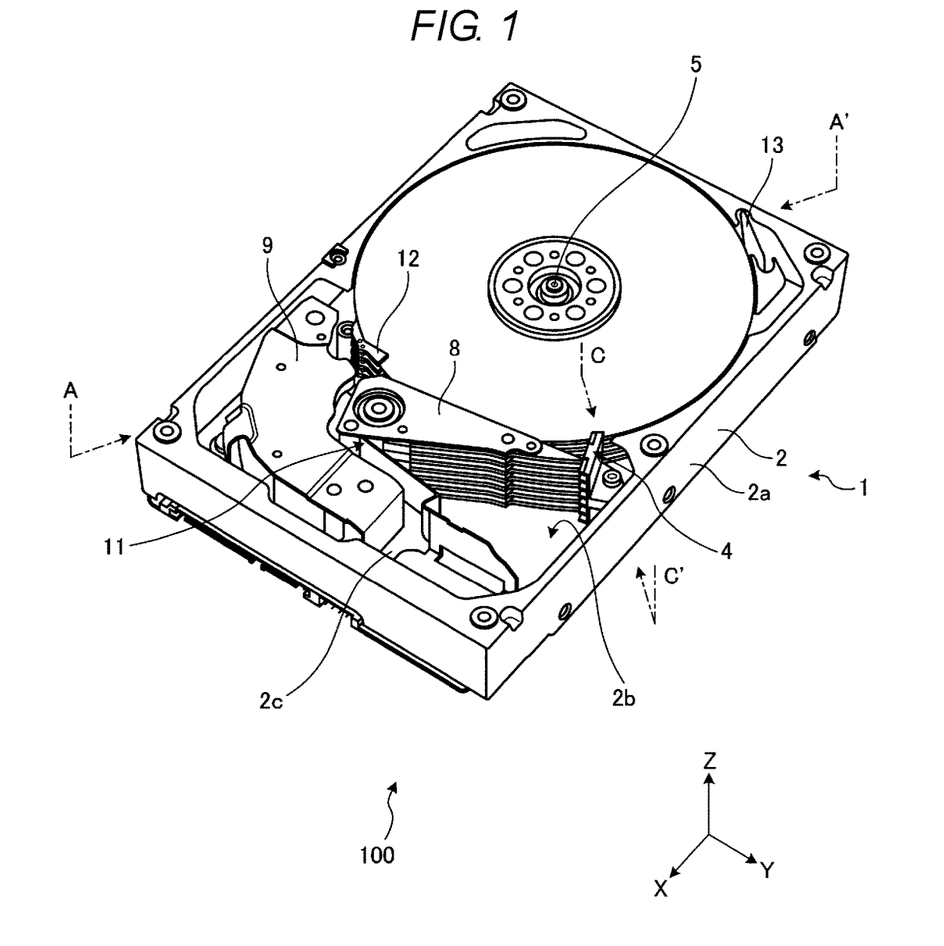
FIG. 1 is a perspective view illustrating a configuration of a disk device according to an embodiment.
Figure 2A:
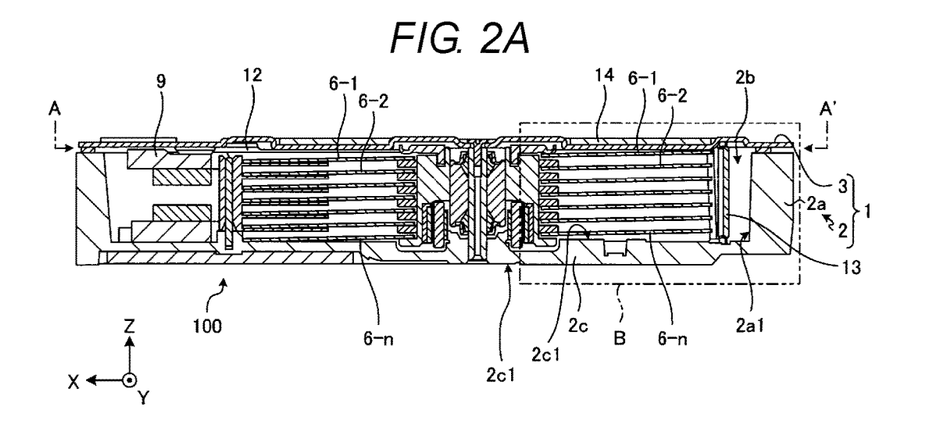
FIGS. 2A and 2B are cross-sectional views each illustrating the configuration of the disk device according to the embodiment.
Figure 2B:
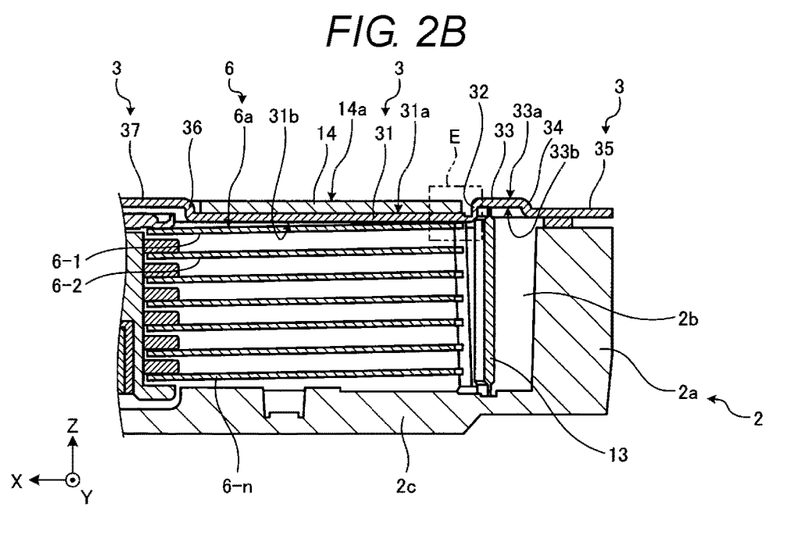

A disk device 100 according to an embodiment will be described with reference to FIG. 1 and FIGS. 2A and 2B. FIG. 1 is a perspective view illustrating the configuration of the disk device 100. FIG. 2A is a cross-sectional view illustrating the configuration of the disk device 100, and illustrates a cross section corresponding to the cross section taken along line A-A' of the disk device 100 illustrated in FIG. 1. FIG. 2B is an enlarged cross-sectional view of a portion B surrounded by a two-dot chain line in FIG. 2A. In FIG. 1 and FIGS. 2A and 2B, a direction along the rotational axis of each disk medium 6 is defined as a Z direction, a direction along the longitudinal direction of housing 1 in a plane perpendicular to the Z direction is defined as an X direction, and a direction perpendicular to the Z direction and the X direction is defined as a Y direction.

As illustrated in FIG. 1 or FIG. 2A, the disk device 100 includes a housing 1, a plurality of disk media 6-1 to 6-$n$, a plurality of heads 4, a spindle motor (SPM) 5, a carriage assembly 8, a voice coil motor (VCM) 9, a ramp member 10, a substrate unit 11, a spoiler 12, a filter 13, and a buffer plate 14.

The housing 1 has a base 2 and a top cover 3. The base 2 has a rectangular box shape and includes an inner wall 2$a$, an opening 2$b$, and a bottom wall 2$c$. An inner wall surface 2$a$1 of the inner wall 2$a$ forms a curved surface corresponding to the outer periphery of each of the disk media 6-1 to 6-$n$. The opening 2$b$ is a portion of the base 2 which is opened in the Z direction. The top cover 3 is fastened to the base 2 by a plurality of screws and closes the opening 2$b$ of the base 2.

The inner wall surface 2$a$1 is formed in an arc shape which is concentric with an arc of the outer periphery of each of the disk media 6-1 to 6-$n$ and has a radius larger than the arc of the outer periphery of each of the disk media 6-1 to 6-$n$. Thus, the inner wall surface 2$a$1 covers the outer periphery of each of the disk media 6-1 to 6-$n$.

The plurality of disk media 6-1 to 6-$n$, the SPM5, the plurality of heads 4, the carriage assembly 8, the VCM9, the ramp member 10, the substrate unit 11, the spoiler 12, the filter 13, and the like are disposed within the housing 1.

Figure 3:
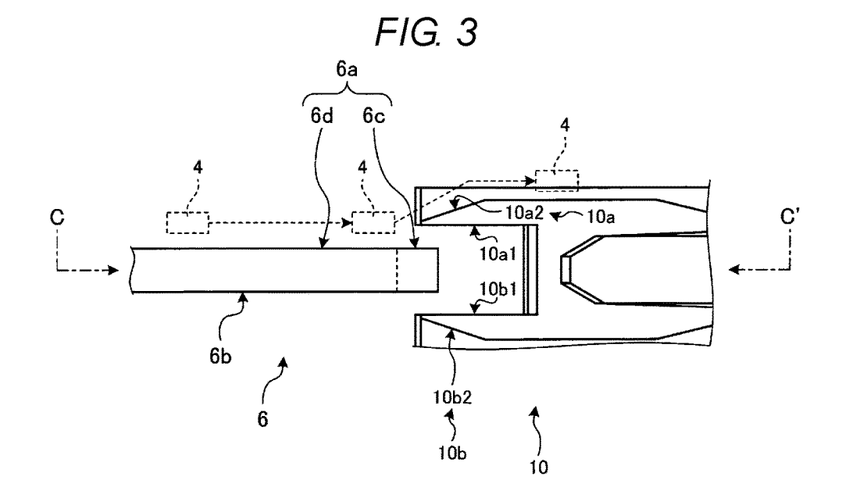
FIG. 3 is an enlarged cross-sectional view illustrating configurations of a disk medium and a ramp member according to the embodiment.

The plurality of disk media 6-1 to 6-$n$ are supported via the SPM5 to be rotatable about the Z direction as a rotation axis. Each disk medium 6 has a plurality of concentric tracks thereon defined by a servo pattern recorded on the disk medium. For example, a region in which the plurality of tracks on the recording surface 6$a$ of the disk medium 6 are positioned constitutes a data zone (first zone) 6$d$, as illustrated in FIG. 3. The data zone 6$d$ is defined as an area in which data is capable of being written and as an area that is accessible by a head 4. (see the cross-sectional view of FIG. 3 in which the portions of the disk medium 6 and the ramp member 10 are enlarged, which will be described later). An area outside the outermost track on the recording surface 6$a$ of the disk medium 6 constitutes an invalid zone (second zone) 6$c$. The invalid zone 6$c$ is disposed adjacent to the data zone 6$d$, on the outer edge side of the disk medium 6 from the data zone 6$d$. The invalid zone 6$c$ is defined as an area in which data is not capable of being written and as an area which is not accessible by the head 4.

Thus, the data zone 6*d* is set to be written and the invalid zone 6*c* is set not to be written. The width of the invalid zone 6*c* from the outer edge of the disk medium 6 corresponds to a radial position at which the ramp member 10 overlaps (in the radial direction) the recording surface 6*a* when viewed from a direction perpendicular to the recording surface 6*a*. For example, see the cross-sectional view of FIG. 3 and the plan view of FIG. 4 to be described later.

The SPM5 is subjected to rotational drive control that is performed by a controller (not illustrated) included in the disk device 100 and a driver circuit (not illustrated) controlled by the controller. A plurality of heads 4 are included in the disk device 100. Each of heads 4 corresponds to one of the recording surfaces 6*a* on the front sides or the recording surfaces 6*b* on the back sides of the plurality of disk media 6-1 to 6-*n*, respectively (see FIG. 3 to be described later). Each of the plurality of heads 4 are disposed so as to face a respective corresponding one of the front surfaces (recording surfaces 6*a*) or the back surfaces (recording surfaces 6*b*) of the disk media 6 Each of the heads 4 writes data on and reads data from one of the disk media 6-1 to 6-*n*. The carriage assembly 8 supports and moves heads 4 with respect to the disk media 6-1 to 6-*n*. The carriage assembly 8 is driven by the VCM9. The VCM9 includes a carriage drive mechanism that rotates and positions the carriage assembly 8 radially with respect to the disk.

As illustrated in FIG. 3, the ramp member 10 is disposed in close proximity to the disk medium 6 (any one of 6-1 to 6-*n*), and has a ramp or wedge-shaped portion corresponding to each of the recording surfaces 6*a* and 6*b* of the disk medium 6. That is, the ramp member is configured with two wedge-shaped portions, each corresponding to one of recording surfaces 6*a* or 6*b*. For example, tip ends 10*a* and 10*b* include respective surfaces 10*a*1 and 10*b*1 that are substantially parallel with the recording surfaces 6*a* and 6*b* and respective surfaces 10*a*2 and 10*b*2 that are each inclined at an acute angle with respect to the recording surfaces 6*a* and 6*b*. Thus, surfaces 10*a*1 and 10*a*2 form one wedge-shaped portion and surfaces 10*b*1 and 10*b*2 form another wedge-shaped portion. FIG. 3 is a cross-sectional view illustrating the configuration of the disk medium 6 and the ramp member 10. Specifically, FIG. 3 is a cross section corresponding to a cross section taken along line C-C' of the disk device 100 illustrated in FIG. 1. The ramp member 10 holds the head 4 (see FIG. 3) and the carriage assembly 8 (see FIG. 1) in a retracted position away from the disk medium 6 during, unloading when the head 4 does not need to access the disk medium 6.

The substrate unit 11 illustrated in FIG. 1 includes a preamplifier (not illustrated) and a controller. The controller controls writing of data and the like to the disk medium 6 and reading of data and the like from the disk medium 6 by the head 4 via the preamplifier. Further, although not specifically illustrated, a printed circuit board configured to control the operations of the SPM5, the VCM9, and the heads 4 via the substrate unit 11 is screwed onto an outer surface 2*c*1 of the bottom wall 2*c* (shown in FIG. 2B) of the base 2.

As illustrated in FIGS. 1 and 2A, the spoiler 12 is disposed in close proximity to the disk medium 6 (e.g., 6-1) and extends in the X and Y directions along the recording surface 6*a* while being spaced apart in the Z direction from the recording surface 6*a* of the disk medium 6. Thus, the spoiler 12 may trim the air flow caused by the rotation of the disk media 6-1 to 6-*n*, may reduce air disturbance near the disk media 6-1 to 6-*n*, and may prevent vibration of media 6-1 to 6-*n* caused by disk flutter that can occur when the disk rotates.

The filter 13 is disposed in close proximity to the disk media 6-1 to 6-*n* and extends in the Z direction along the outer peripheral edge surfaces of the disk media 6-1 to 6-*n*. Thus, the filter 13 functions as a circulating filter that collects dust using the air flow within the housing 1 and the air flow near the edge surfaces of the disk media 6-1 to 6-*n*. Because the filter 13 collects dust near each of the recording surfaces of the disk media 6-1 to 6-*n* by the air flow, the filter 13 has a height (i.e., length in the Z-direction) that is greater than the stacking height of the disk media 6-1 to 6-*n*. In addition, the filter 13 is typically disposed near a corner of the housing 1 due to space and functionality reasons.

The buffer plate 14 is disposed on a main surface 31*a* of the top cover 3 and extends in the X and Y directions along the main surface 31*a*. The buffer plate 14 may be fixed to the main surface 31*a* of the top cover 3 via an adhesive (double-sided tape material) BD (see, e.g., FIG. 6). The buffer plate 14 buffers vibration and/or noise caused by the rotation of the disk media 6-1 to 6-*n*. For example, by forming the buffer plate 14 of a material having a high specific gravity (e.g., stainless steel (SUS) or copper), a large mass may be secured to enable the buffer plate 14 to function as a damping plate and a sound absorbing plate.

The storage capacity of the disk device 100 may be increased by increasing the number (n) of disk media 6-1 to 6-*n*. FIG. 2A illustrates a case where n is 7, as an example. In order to increase the number of stacked disk media 6, it is effective to reduce the thickness of the disk media 6. In order to improve the positioning accuracy of the head 4 and increase the storage capacity, it is effective to increase the number of the disk media 6 and to make the disk medium 6 and the head 4 closer to each other. When the thickness of the disk medium 6 is reduced and the number thereof is increased while maintaining the outer shape of the housing 1 (e.g., to fill a 3.5 inch form factor), the gap between the disk medium 6 and the top cover 3 is reduced. Further, to obtain the effect of trimming the air flow caused by the rotation of the disk medium 6 (i.e., the shroud effect), the gap between the disk medium 6 and the top cover 3 is typically reduced. In light of the above, when an impact is applied to the housing 1 from the outside, the disk medium 6 and the top cover 3 likely come into contact with each other.

Figure 4:
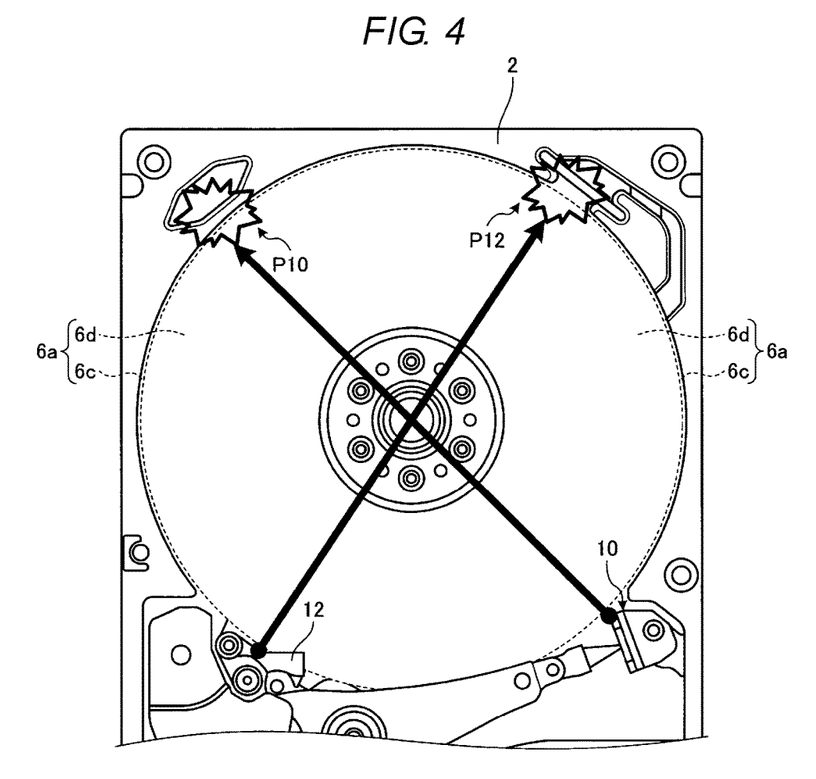
FIG. 4 is a plan view illustrating portions of a disk medium that commonly impact a top cover, according to the embodiment.

For example, since the ramp member 10 and/or the spoiler 12 are positioned close to the disk medium 6, when an impact is applied to the housing 1 from the outside (e.g., when the disk device 100 is mounted in a server rack), there is a high probability that the ramp member 10 and/or the spoiler 12 can first come into contact with the disk medium 6, as illustrated in FIG. 4. As the ramp member 10 and/or the spoiler 12 come into contact with the disk medium 6, the swinging of the disk medium 6 in the Z direction at the positions P10 and P12, which are diagonal to each other with respect to the center of the disk medium 6, tends to be the largest and at these positions P10 and P12, the top cover 3 and the disk medium 6 can easily come into contact with each other.

Here, the top cover 3 may be formed of a predetermined material. The predetermined material refers to a material that is suitable for ensuring rigidity. For example, stainless steel (SUS) may be employed, as represented in Table 1. Table 1 represents the relationship between the outer bending R (the radius of curvature at the outer surface of the bend) for 90° bends and the plate thickness when the top cover is formed of SUS.

Relationship between outer bending R in 90° bending of SUS and plate thickness

TABLE 1

| Plate Thickness [mm] | Outer Bending R [mm] |
|---|---|
| 0.4 | 0.5 to 1.0 |
| 0.5 | 0.9 to 1.6 |
| 0.6 | 1.1 to 1.7 |
| 0.7 | 1.2 to 1.9 |
| 0.8 | 1.4 to 2.1 |
| 0.9 | 1.5 to 2.2 |
| 1.0 | 1.7 to 2.4 |

As illustrated in FIG. 2A, the top cover 3 may be formed by performing sheet metal working, that is, a bending process, on a predetermined plate material in order to improve the rigidity of the top cover 3 while the buffer plate 14 is mounted thereon without extending above the outer surface of top cover 3. In addition, the thickness of the predetermined plate material used for the top cover 3 becomes thicker than the predetermined thickness to ensure the rigidity of the top cover 3.

Thus, in the portion of the top cover 3 which faces the recording surface 6a of the uppermost disk medium 6-1, the outer bending radius R of the bent end portion tends to be increased due to tensile stress. For example, as illustrated in Table 1, in the case of the top cover 3 having a thickness of 0.8 mm, the outer bending radius R is about 2 mm or more.

Therefore, in such a case, the outer end portion of a flat surface of the top cover 3 which faces the recording surface 6a of the uppermost disk medium 6-1 may be located at a position facing the data zone 6d. Therefore, when the disk medium 6 is forcefully shaken due to an impact applied from the outside to the housing 1, the position at which the recording surface 6a of the disk medium 6-1 comes into contact with the top cover 3 may be the data zone 6d located within the invalid zone 6c. When the data zone 6d on the recording surface 6a of the disk medium 6-1 comes into contact with the top cover 3, the data zone 6d may be damaged and the data recorded in the data zone 6d may be destroyed.

Further, in the present embodiment, the flat surface is a surface that does is not undergo a pressing or stamping process for forming a protrusion or a recess. In addition, the flat surface does not nor include a projection or a depression. The flat surface is considered to be a substantially flat surface even if some microscopic undulation is observed thereon.

Thus, in the present embodiment, the data zone 6d of the disk medium is prevented from being damaged (and thereby protecting the data stored thereto) by configuring the disk device 100 so that the outer end position of the flat surface of the top cover 3 that faces the recording surface 6a of the uppermost disk medium 6-1 is located outside the outer end of the data zone 6d.

Specifically, as illustrated in FIG. 2B, the top cover 3 includes a center horizontal portion (first portion) 31, a curved portion (second portion) 32, an outer horizontal portion (third portion) 33, an outer bent portion 34, a peripheral horizontal portion 35, a central bent portion 36, and a mid-portion 37.

The center horizontal portion 31 has a surface extending in substantially X and Y directions from the center point of the disk medium 6 substantially parallel to the recording surface 6a. That is, the center horizontal portion 31 has a surface extending in the plane direction of the recording surface of the disk medium 6 from the center point of the recording surface to an outer peripheral end portion.

The center point of the disk medium 6 is located in a position corresponding to the rotational axis of the spindle motor 5. The curved portion 32 has a surface extending from the outer peripheral end portion of the center horizontal portion 31 in the direction away from the recording surface 6a (+Z direction). The curved portion 32 is bent in the +Z direction (i.e., away from disk medium 6) from the outer peripheral end portion of the center horizontal portion 31, and extends to the outer horizontal portion 33. The outer horizontal portion 33 has a surface extending in the plane direction of the recording surface of the disk medium 6 from the curved portion 32 in the direction away from the center point of the recording surface (−X direction). The outer horizontal portion 33 is bent in the −X direction from the end of the curved portion 32 that is opposite to the outer peripheral end portion of the center horizontal portion 31. A lower surface 33b of the outer horizontal portion 33 is in contact with the filter 13 and fixes the filter 13.

The outer bent portion 34 extends in the direction approaching the inner wall 2a (−Z direction) from the end of the outer horizontal portion 33 that is opposite to the curved portion 32. The outer bent portion 34 is bent in the −Z direction from the end of the outer horizontal portion 33 which is opposite to the curved portion 32. The peripheral horizontal portion 35 extends in a direction away from the center of the disk medium 6 (−X direction) from the end of the outer bent portion 34 which is opposite to the outer horizontal portion 33. The peripheral horizontal portion 35 is bent in the −X direction from the end the outer bent portion 34 that is opposite to the outer horizontal portion 33.

The central bent portion 36 extends from the inner end of the center horizontal portion 31 in the direction away from the recording surface 6a (+Z direction). The central bent portion 36 is bent in the +Z direction from an inner end of the center horizontal portion 31. The mid-portion 37 extends in the direction approaching the center of the disk medium 6 (+X direction) from the end of the central bent portion 36 which is opposite to the center horizontal portion 31. The mid-portion 37 is bent in the +X direction from the opposite end of the center horizontal portion 31 in the central bent portion 36.

The space external to housing 1 and bounded by the central bent portion 36, the center horizontal portion 31, and the curved portion 32 is a recess having a depth corresponding to the thickness of the buffer plate 14. For example, when the buffer plate 14 is accommodated in the recess, the upper surface 14a of the buffer plate 14 has a height substantially corresponding to the outer horizontal portion 33 and the upper surface 33a of the outer horizontal portion 33. As a result, the buffer plate 14 is compactly mounted.

In the top cover 3, at least the outer peripheral end portion of the center horizontal portion 31 has an internal flat surface 31b which faces toward the data zone 6d and the invalid zone 6c in the recording surface 6a of the disk medium 6-1. The outer peripheral end portion of the center horizontal portion 31 also extends to the invalid zone 6c. For example, the center horizontal portion 31 has an internal flat surface 31b which faces the data zone 6d and the invalid zone 6c on the recording surface 6a of the disk medium 6-1 and also extends to the outer side of the invalid zone 6c (i.e., to the outer edge of the disk medium 6-1).

In a situation in which the thickness of the plate material used for the top cover 3 is set to a thickness sufficient to secure the rigidity of the top cover 3 (e.g., a 0.8 mm thickness), when the center horizontal portion 31 and the curved portion 32 are formed merely by bending, the outer bending R becomes too large to form as shown in the table 1.

Figure 5:
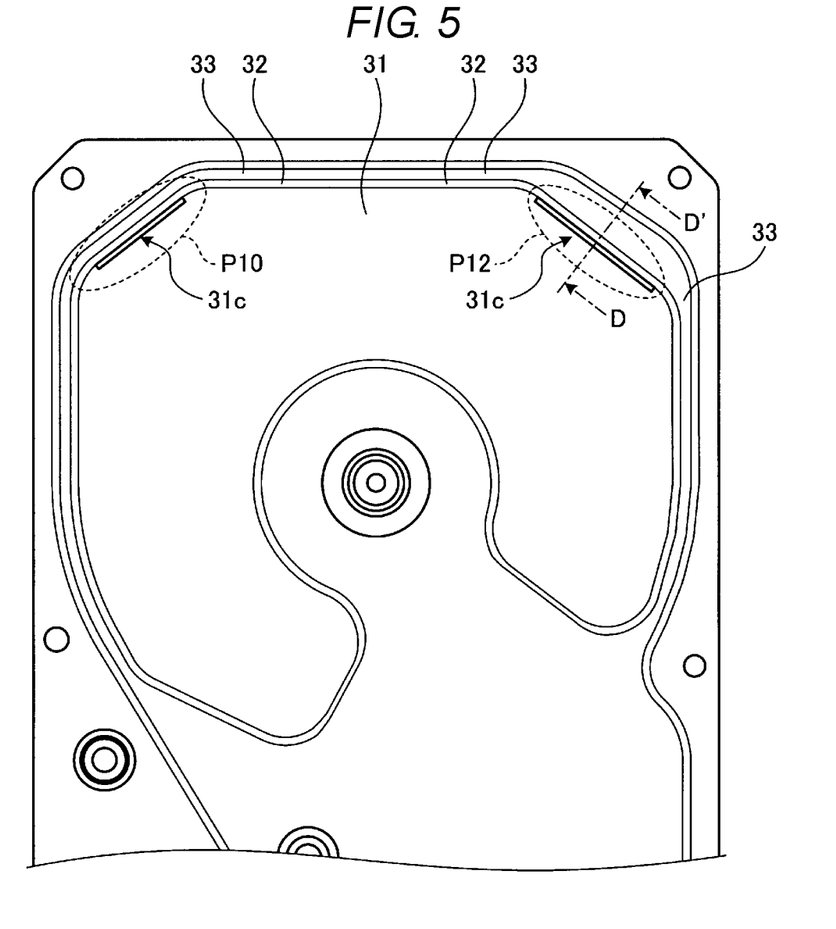
FIG. 5 is a plan view illustrating a configuration of a top cover according to the embodiment.
Figure 6:
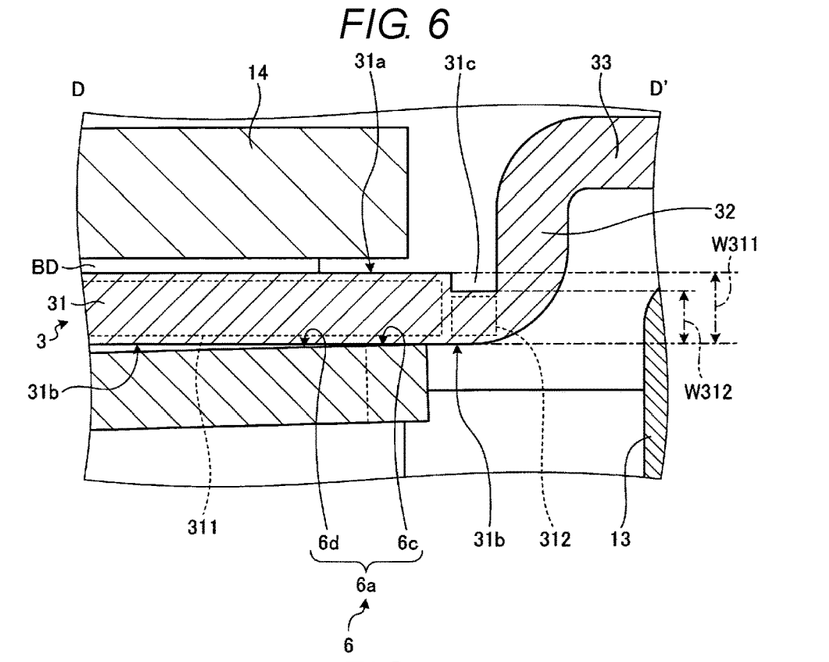
FIG. 6 is an enlarged cross-sectional view illustrating the configuration of the top cover according to the embodiment.

Therefore, as illustrated in FIGS. 5 and 6, it is effective to perform a coining process on the plate material used for the top cover 3, rather than a bending process. FIG. 5 is a plan view illustrating the configuration of the top cover 3. FIG. 6 is a cross-sectional view illustrating the configuration of the top cover 3, an enlarged cross-sectional view in which the portion E denoted by a dotted line in FIG. 2B is enlarged. More specifically, FIG. 6 is an enlarged cross-sectional view in which the cross section taken along line D-D' of the configuration of FIG. 5 is enlarged.

The center horizontal portion 31 in the top cover 3 also has a recess 31c near the boundary with the curved portion 32 and on the main surface 31a opposite to the internal flat surface 31b. The recess 31c may be formed by performing a coining process on a region near the boundary with the curved portion 32 on the main surface 31a, before or after performing a raising or bending process on the plate material used for the top cover 3.

As illustrated in FIG. 5, in a plan view, the center horizontal portion 31 may have recesses 31c at position P10 that is located opposite the ramp member 10 and aligned with the ramp member 10 and the center of the disk medium 6-1, and at position P12 that is located opposite the spoiler 12 and the center of the disk medium 6-1 and aligned with the spoiler 10 and the center of the disk medium 6-1.

As illustrated in FIG. 6, the center horizontal portion 31 has a region 311 and a region 312, which are each shown in a sectional view and are indicated with dotted lines. The region 311 may constitute a main portion in the center horizontal portion 31. The region 312 is disposed between the region 311 and the curved portion 32.

The region 311 and the region 312 mutually form a continuous surface (internal flat surface 31b) facing the disk medium 6. In addition, the region 311 and the region 312 have substantially the same location in the Z direction from the bottom wall 2c of the base 2. By contrast, the region 311 and the region 312 mutually form a discontinuous surface on the side opposite to the disk medium 6. That is, the distance in the Z direction from the bottom wall 2c to the main surface of the region 311 on the side of region 311 opposite to the disk medium 6 is higher than the distance in the Z direction from the bottom wall 2c of the main surface to the region 312 on the side of region 312 opposite to the disk medium 6.

Assuming that the thickness of the region 311 is W311 and the thickness of the region 312 is W312, the following equation 1 indicates this.

$$W311 > W312 \quad \text{Equation 1}$$

For example, when the plate thickness T of the top cover 3 is 0.5 mm or more and the outer bending R between the center horizontal portion 31 and the curved portion 32 is formed to be 1 mm or less, the portion of the top cover 3 which comes into contact with the disk medium 6 during the vertical vibration of the disk medium 6 may be extended radially outward toward inner wall 2a and away from data zone 6d. Thus, while contact between the disk medium and top cover 3 (at curved portion 32) can occur, such contact occurs in invalid zone 6c rather than in data zone 6d.

In the present embodiment, since the outer bending R may be formed to be about 1 mm without changing the plate thickness, the top cover may be changed without reducing the rigidity and associated lack of vibration of the top cover 3. In addition, the shape of the present embodiment may be implemented by performing a coining process capable of obtaining a high bending accuracy and a small inner radius R. That is the coining process enables a small radius of curvature on the inner side of the bend of curved portion 32. It is noted that the inner side of the bend of curved portion 32 is disposed on an outer surface of top cover 3, i.e., the main surface 31a, which faces away from the disk medium 6. That is, the shape of the present embodiment may be implemented by a pressing process while omitting a cutting process, and may be formed easily at a low cost.

As described above, in the present embodiment, the disk device 100 is configured such that the outer end position of the internal flat surface 31b in the portion of the top cover 3 which faces the recording surface 6a of the uppermost disk medium 6-1 is located outside the outer end of the data zone 6d. This makes it possible to reduce, in the radial direction, the size of the portion of the top cover 3 which comes into contact with the disk medium 6 during vertical vibration. That is, in the disk medium 6, the portion of the disk medium to come into contact with the top cover 3 can be set to be outside the data zone 6d on the recording surface 6a, so that contact with the data zone 6d may be eliminated and damage to the data zone 6d may be prevented.

Further, in the present embodiment, in the top cover 3, the center horizontal portion 31 has a recess 31c near the boundary with the curved portion 32 and on the main surface 31a opposite to the internal flat surface 31b. The recess 31c may be formed by a coining process. That is, the outer bending R shape of the top cover 3 that allows the outer end position of the flat surface 31b to be located radially outside the outer end of the data zone 6d may be implemented by performing a coining process capable of obtaining a high bending accuracy and a small inner radius R of curved portion 32. Therefore, the above-described shape may be implemented by a pressing process (a raising process, a bending process) without a cutting process, and may be formed easily at a low cost. In addition, due to the simple structure, no special manufacturing equipment is required so that the above-described shape may be implemented at a low cost.

Second Embodiment

In a case where the plate thickness T of the top cover 3 is less than 0.5 mm, the rigidity of the top cover 3 can be less than the required rigidity and, when the housing 1 is grasped by a user, the top cover 3 may deflect inward sufficiently far that the disk medium 6 may be pressed and damaged. Further, when the outer bending R shape of curved portion 32 exceeds 1 mm, the outer end position of the flat surface of the top cover 3 which faces the recording surface 6a of the uppermost disk medium 6-1 is positioned to face the data zone 6d. Therefore, when the disk medium 6 is forcibly shaken or vibrated due to an impact applied from the outside of the housing 1, the position at which the recording surface 6a of the disk medium 6-1 comes into contact with the top cover 3 tends to be the data zone 6d on the inner peripheral side from the invalid zone 6c. When the data zone 6d on the recording surface 6a of the disk medium 6-1 comes into contact with the top cover 3, damage such as scratches may occur in the data zone 6d and the data recorded in the data zone 6d may be destroyed.

In the second embodiment, for example, the top cover 3 has a curved shape of a plate material having a thickness of 0.5 mm or more, and the outer bending R value between the center horizontal portion 31 and the curved portion 32 is set to 1 mm or less. Thus, the portion of the top cover 3 that comes into contact with the disk medium 6 during vertical vibration may be reduced in the radial direction while satisfying the required rigidity of the top cover 3. That is, in the disk medium 6, the position to come into contact with the top cover 3 may be outside the data zone 6$d$ on the recording surface 6$a$ and contact within the data zone 6$d$ may be eliminated, so that it is possible to prevent the data zone 6$d$ from being damaged.

Figure 7:
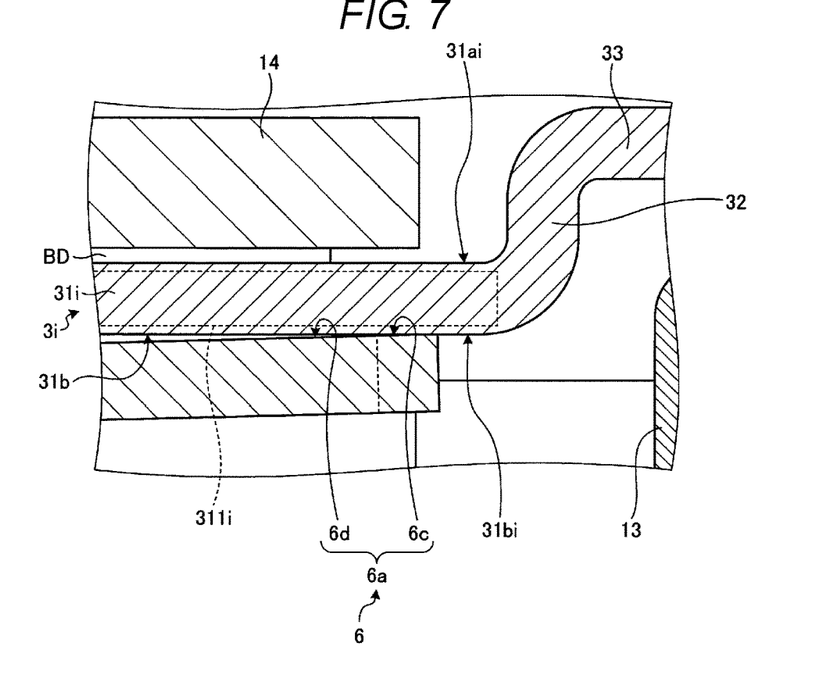
FIG. 7 is an enlarged cross-sectional view illustrating a configuration of a top cover according to a modification of the embodiment.

In addition, as illustrated in FIG. 7, the outer bending R shape of a top cover 3$i$ may be formed without a coining process while satisfying the required rigidity by the following processing method of the top cover 3$i$. A shape equivalent to the curved shape of the top cover 3 (e.g., the cross-sectional shape of the top cover 3$i$ illustrated in FIG. 7) is formed by casting of a carbon steel material or the like, or by powder sintering of an engineering ceramic such as alumina or zirconia. Therefore, the outer bending R of curved portion 32 in the second embodiment may be implemented without using a coining process (i.e., without forming the recess 31$c$ near the boundary with the curved portion 32 on the main surface 31$ai$) while satisfying the rigidity required for the top cover 3$i$. In this way, the outer bending R shape of the curved portion 32 of the top cover 3$i$ may be implemented so that the outer end position of the flat surface 31$bi$ is outside the outer end of the data zone 6$d$. That is, even when the region 312 (see FIG. 6) of the center horizontal portion 31$i$ is omitted and the region 311$i$ is configured to extend to the curved portion 32, the flat surface 31$bi$ may be configured such that the outer end position thereof is outside the outer end of the data zone 6$d$. As a result, as in the first embodiment, the contact between the top cover 3 with the disk medium 6 in the data zone 6$d$ may be eliminated so that it is possible to prevent the data zone 6$d$ from being damaged.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
    a disk medium having a recording surface;
    a ramp member in close proximity to the disk medium; and
    a top cover comprising a first portion extending along the recording surface, a second portion having a curved shape and continuous from the first portion toward a periphery of the top cover, and a third portion continuous from the second portion toward the periphery of the top cover and extending in a direction along the recording surface, wherein
    the recording surface comprises a first zone in which data is set to be written, and a second zone in which data is set not to be written, the second zone being at an outer edge of the disk medium,
    the first portion of the top cover faces the first zone and at least a part of the second zone of the recording surface,
    at least a part of the second zone from the outer edge of the disk medium corresponds to a position at which the ramp member overlaps the recording surface when viewed from a direction perpendicular to the recording surface, and
    the first portion includes a recess at a position opposite to the ramp member across a center region of the disk medium.

2. The disk device according to claim 1, wherein the second portion of the top cover is formed via a coining process.

3. The disk device according to claim 1, wherein the recess is near a boundary with the second portion and on a main surface of the top cover that is opposite to a surface of the top cover facing the disk medium.

4. The disk device according to claim 1, wherein the first portion includes:
    a first region having a first thickness; and
    a second region between the first region and the second portion and having a second thickness smaller than the first thickness.

5. The disk device according to claim 1, wherein the recess is at a boundary with the second portion.

6. The disk device according to claim 1, wherein the recess is on a main surface of the top cover that is opposite to a surface of the top cover facing the disk medium.

7. The disk device according to claim 1, further comprising a buffer plate on a main surface of the top cover that is opposite to a surface of the first portion of the top cover facing the disk medium, the buffer plate extending along the main surface so that a top surface of the buffer plate has a height corresponding to the third portion.

8. The disk device according to claim 1, wherein the top cover has a thickness of 0.5 mm or more, and
    wherein an outer bending radius of the second portion is 1 mm or less.

9. The disk device according to claim 1, wherein the second portion of the top cover has a thickness of 0.5 mm or more.

10. A disk device comprising:
    a disk medium having a recording surface; and
    a top cover comprising a first portion along the recording surface, a second portion having a curved shape and continuous from the first portion toward a periphery of the top cover, and a third portion continuous from the second portion toward the periphery of the top cover and extending in a direction along the recording surface, wherein
    the recording surface comprises a first zone in which data is set to be written, and a second zone in which data is set not to be written, the second zone being at an outer edge of the disk medium,
    the first portion of the top cover faces the first zone and at least a part of the second zone of the recording surface,
    the top cover has a thickness of 0.5 mm or more, and
    an outer bending radius of the second portion is 1 mm or less.

11. The disk device according to claim 10, wherein the second portion of the top cover is formed via a coining process.

12. The disk device according to claim 10, wherein the first portion of the top cover includes a recess near a boundary with the second portion and on a main surface of the top cover that is opposite to a surface of the top cover facing the disk medium.

13. The disk device according to claim 12, further comprising a ramp member in close proximity to the disk medium,
wherein the recess is at a position opposite to the ramp member across a center region of the disk medium.

14. The disk device according to claim 13, further comprising a spoiler disposed in close proximity to the disk medium,
wherein the first portion of the top cover further includes a second recess at a position opposite to the spoiler across the center region of the disk medium.

15. The disk device according to claim 10, wherein the first portion includes:
a first region having a first thickness; and
a second region between the first region and the second portion and having a second thickness smaller than the first thickness.

16. The disk device according to claim 10, wherein the second portion of the top cover has a thickness of 0.5 mm or more.

17. A disk device comprising:
a disk medium having a recording surface;
a spoiler in close proximity to the disk medium; and
a top cover comprising a first portion extending along the recording surface, a second portion having a curved shape and continuous from the first portion toward a periphery of the top cover, and a third portion continuous from the second portion toward the periphery of the top cover and extending in a direction along the recording surface, wherein
the first portion of the top cover further includes a recess at a position opposite to the spoiler across a center region of the disk medium, the recess being at a boundary with the curved second portion, on a main surface of the top cover that is opposite to a flat surface of the top cover facing the disk medium.

* * * * *